United States Patent
Peres

(10) Patent No.: US 7,062,548 B1
(45) Date of Patent: Jun. 13, 2006

(54) MULTIMEDIA COMMUNICATIONS RESOURCE MANAGEMENT CONTROL SYSTEM AND METHOD

(75) Inventor: Eliana Peres, Ottawa (CA)

(73) Assignee: Mitel Corporation, Kenata (CA)

( * ) Notice: Subject to any disclaimer, the term of this patent is extended or adjusted under 35 U.S.C. 154(b) by 560 days.

(21) Appl. No.: 09/651,842

(22) Filed: Aug. 31, 2000

(30) Foreign Application Priority Data

Aug. 31, 1999 (GB) .................................. 9920464.6

(51) Int. Cl.
*G06F 15/16* (2006.01)
(52) U.S. Cl. ..................................... 709/223; 709/226
(58) Field of Classification Search ................ 709/223, 709/226
See application file for complete search history.

(56) References Cited

U.S. PATENT DOCUMENTS

| | | | | |
|---|---|---|---|---|
| 5,077,791 A | * | 12/1991 | Salihi | ........................ 380/270 |
| 5,287,551 A | * | 2/1994 | Gustafson et al. | .......... 455/509 |
| 5,408,465 A | | 4/1995 | Gusella et al. | |
| 5,448,559 A | * | 9/1995 | Hayter et al. | ................ 370/398 |
| 5,719,942 A | | 2/1998 | Aldred et al. | |
| 5,818,845 A | * | 10/1998 | Moura et al. | ................ 370/449 |
| 5,828,847 A | * | 10/1998 | Gehr et al. | .................. 709/239 |
| 5,898,668 A | | 4/1999 | Shaffer | |
| 5,918,002 A | * | 6/1999 | Klemets et al. | ................ 714/18 |
| 5,946,322 A | * | 8/1999 | Moura et al. | ................ 370/468 |
| 6,223,222 B1 | * | 4/2001 | Fijolek et al. | ............... 709/227 |
| 6,484,212 B1 | * | 11/2002 | Markowitz et al. | .......... 709/246 |

FOREIGN PATENT DOCUMENTS

| | | |
|---|---|---|
| CA | 2186795 | 5/1997 |
| EP | 0 673 138 A2 | 9/1995 |
| EP | 0 913 968 A1 | 5/1999 |
| WO | WO 9828939 | 7/1998 |
| WO | WO 9829992 | 7/1998 |

* cited by examiner

*Primary Examiner*—David Y. Eng
(74) *Attorney, Agent, or Firm*—F. Chau & Associates, LLC

(57) ABSTRACT

A system for management and control of multimedia communications resources comprising a communications pathway, an originating multimedia computing device coupled to the communications pathway with desired quality of service requirements, one or more destination multimedia computing devices coupled to the communications pathway, one or more quality of service management components coupled to the communications pathway, wherein the quality of service management components determines communications pathway resource availability for multimedia communications with the desired quality of service requirements in response to a request from the originating multimedia computing device to establish communications with the destination multimedia computing devices.

15 Claims, 4 Drawing Sheets

MULTIMEDIA COMMUNICATIONS RESOURCE MANAGEMENT CONTROL SYSTEM AND METHOD

The present application claims foreign priority under 35 USC 119 to Great Britain application 9920464.6 filed 31 Aug. 1999, entitled Multimedia Communications Resource Management Control System And Method.

FIELD OF THE INVENTION

The present invention relates generally to the field of communications and more specifically to a system and method for management, allocation and control of resources with quality of service requirements in multimedia communications environments.

BACKGROUND OF THE INVENTION

One characteristic of multimedia is that it requires a high level of bandwidth to support communications. One problem when placing a multimedia call is that the communications pathway or network may not be able to provide the bandwidth required to support the call. This could result in a multimedia call with unacceptably low rate of communications throughout and a high number of delays. Alternately, the communications may just be refused. This results in caller frustration with callers receiving an indication that the call did not succeed and requiring the caller to keep trying to establish communications at a later occasion. A major reason that a caller may not be able to place a multimedia call is that the network does not have enough bandwidth to support the required quality of service for the communications at the point in time that the call is made. In this circumstance, without the availability of features to take further action, the caller would only receive an indication that the call has failed. The user is required to make a further attempt to establish the call at a later time. There is a requirement in the art for a system and method to assist a caller to find out when the network is capable or enabled to establish multimedia communications with a desired quality of service as required by the caller, and take further or alternative action when the desired quality of service is not available.

SUMMARY OF THE INVENTION

With the present invention, users have the ability to be notified when the communications pathway has the capability to place the call according to the requested quality of service, and the call can be automatically placed at that time if the user desires. Quality of service (QOS) may be bandwidth as well as other features or aspects related to the service being provided. The present invention has numerous benefits. Callers do not establish connections where the quality of service is not adequate to support their requirements which saves resources. Furthermore, communication bandwidth is more effectively utilized with only properly supported calls enabled. This results in less caller frustration, and ultimately a higher level of call satisfaction. Furthermore, it allows for additional features to be supported, such as call back, camp-on etc. The present invention is implemented with one or more QOS management components which manage quality of service on the communications pathway including bandwidth. The QOS management components include at least one resource status databases, (also known as Management Information Bases or MIBs), which are databases that are constantly updated on the status of the communications pathway. The QOS management components may be embodied in a single hardware device or optionally embodied in multiple connected devices which include servers and their corresponding software. The QOS management function can be decentralized, to allow for scalability. The MIBs may also be decentralized, allowing for scalability and expansion, including different platforms and environments.

According to one aspect of the present invention there is provided: a system for management and control of multimedia communications resources comprising: a communications pathway; an originating multimedia computing device coupled to the communications pathway with desired quality of service requirements; (c) one or more destination multimedia computing devices coupled to the communications pathway; one or more quality of service management components coupled to the communications pathway; wherein the quality of service management components determine communications pathway resource availability for multimedia communications with the desired quality of service requirements in response to a request from the originating multimedia computing device to establish communications with the destination multimedia computing devices.

According to a further aspect of the present invention there is provided: a method of management and control of resources for multimedia communications comprising the steps of: (a) generating a request from an originating multimedia computing device to a quality of service management component for establishment of multimedia communications with one or more destination multimedia communications devices over a communications pathway with a desired quality of service; (b) issuing a query of available service quality of resources from the quality of service management component to one or more resource status databases; (c) issuing replies from the resource status databases to the quality of service management component on the available service quality of resources; (d) processing the replies by the quality of service management component to determine availability of the desired quality of service with the features; (e) sending a positive or negative response to the originating multimedia desktop device from the quality of service management component corresponding to the request on the establishment of multimedia communications.

According to another aspect of the present invention there is provided: a method of management and control of resources for multimedia communications comprising the steps of: (a) generating a first request from an originating multimedia computing device to a communications server for establishment of multimedia communications with one or more destination multimedia communications devices over a communications pathway with a desired quality of service; (b) determining features of the multimedia communications for the desired quality of service by the communications server; (c) issuing a second request from the communications server to a quality of service management server for the desired quality of service with the features; (d) issuing a query of available service quality of resources from the quality of service management server to one or more resource status databases; (e) issuing replies from the resource status databases to the quality of service manager on the available service quality of resources; (f) processing the replies by the quality of service manager to determine availability of the desired quality of service with the features; (g) generating a first response from the quality of service manager to the communications server in response to the second request; (h) sending a second response to the originating multimedia desktop device from the communications server in response to the first request on the establishment of multimedia communications.

BRIEF DESCRIPTION OF THE DRAWINGS

A detailed description of the preferred embodiments is provided herein below, with reference to the following drawings in which.

DETAILED DESCRIPTION OF THE PREFERRED EMBODIMENT

Figure 1:
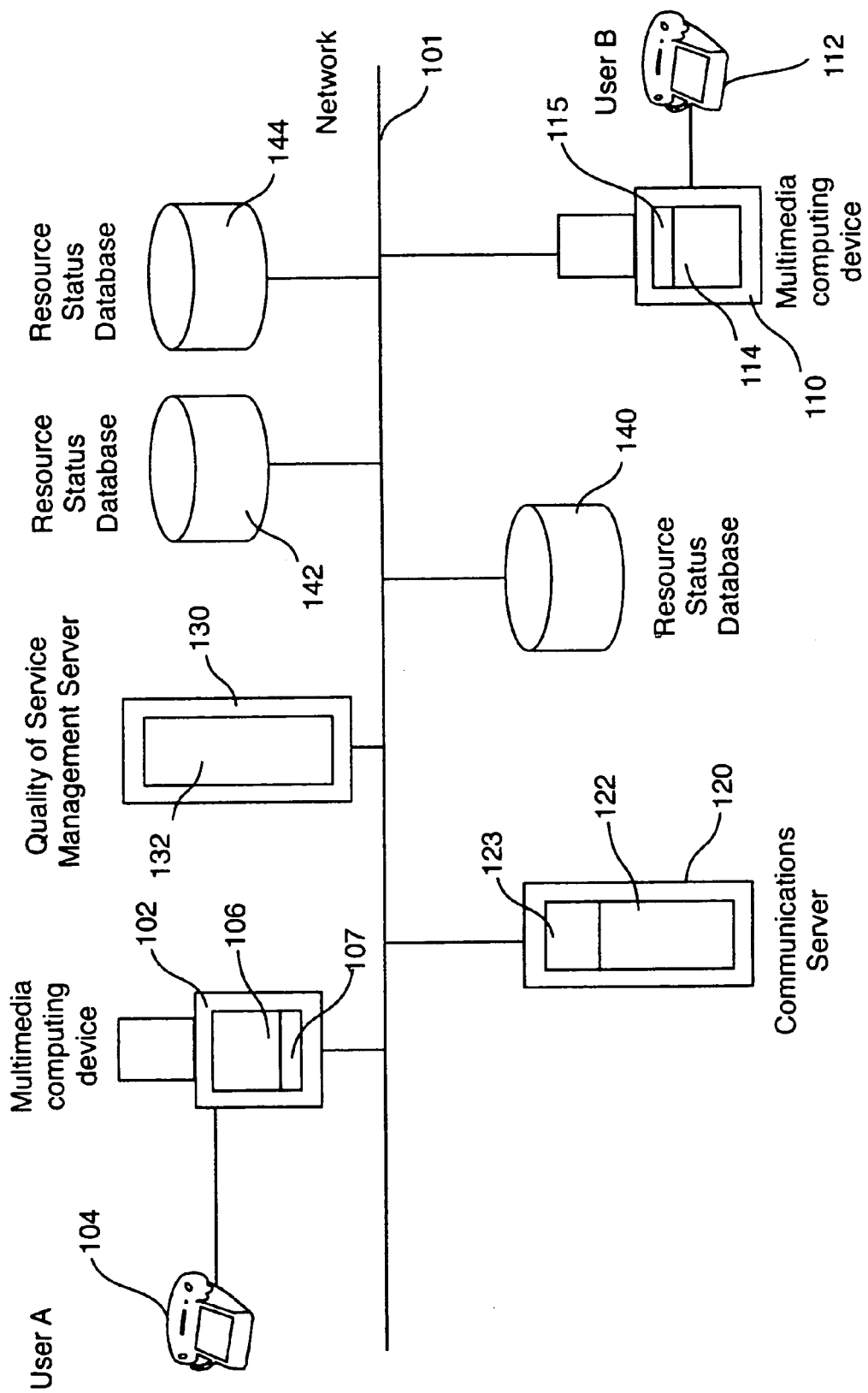
FIG. 1 is a diagrammatic representation of a communications environment employing the system and method of the present invention.

FIG. 1 illustrates an environment 100 of the system and method of the present invention. In the preferred embodiment, environment 100 provides multimedia communications over a communications pathway such as network 101. The communications pathway could be any standard architecture and technology that would allow interconnection of devices capable of multimedia communication, such as a broadband Local Area Network (e.g. switched or shared Ethernet, ATM, a data LAN with an overlay network to support voice and video traffic) and may include a gateway to a public network with matching capabilities in terms of bandwidth and signaling protocols, or devices within a cabinet communicating through a bus architecture.

Multimedia computing devices such as multimedia desktop 102 and 110 are coupled to network 101 and may include devices or peripherals such as telephones 104, 112 respectively for placing and receiving multimedia calls. Multimedia calls can be voice only calls but preferably can include combinations of data, images, sound and video and may involve multiple participants. Multimedia calls for each user may have various telephony call features such as call waiting, camp-on etc. When calls are placed or requested through multimedia desktop 102/110, they are requested with a desired quality of service. Multimedia desktop 102 and 110 may be a personal computer such as is well known in the art with an operating system supporting a graphical user interface or any such device well known in the art of similar capability. One example of such an operating system is Windows 95 from Microsoft, but other commercially available operating systems could be used. Multimedia desktop 102 and 110 also have multimedia desktop application software 106 and 114 running as a software application that provides multimedia call functions. Software applications that provide multimedia functions are well known in the art, and include such products as Microsoft™ Netmeeting. Multimedia desktop 102 and 110 each interface the caller with the network 101 during all phases of a call (establishment, maintenance, release). Multimedia desktop 102, 110 are capable of transmitting and receiving any combination of sound, voice, images, video, and data communication over the network 101.

Multimedia computing device 102/110 also has a quality of service (QOS) caller module 107/115 coupled to, linked to, or embedded in application software 106/114 for managing quality of service from the user perspective. In the preferred embodiment, QOS caller module 107/115 is an executable software program or library written in any suitable programming language operating in cooperation with application 106/114 to provide caller QOS services, and for interfacing with QOS management components.

The environment 100 also includes one or more QOS management components for management of quality of service on the communications pathway. Such components include at least one resource status database operating on a processor device such as well known in the art under control of a software or firmware application process and may optionally include servers of various types with corresponding software. In a preferred embodiment, QOS management components include a communications server 120, a quality of management server 130 and a plurality of resource status databases 142, 144 and 146. Although the QOS management components in the preferred embodiment of FIG. 1 are shown as embodied in multiple hardware components or devices, the invention does not require and is not limited to multiple hardware components or devices. All QOS management components may reside on a single device stored and running in memory as software or firmware processes under processor control.

Communication Server 120 is a device, coupled to network 101, for providing switching functions of multimedia communications on network 101. In a preferred embodiment, it is a server computer as is well known in the art running suitable commercially available communication application control server software 122 that supports the H.323 standard. As an alternative, communication server 120 may be a Private Branch Exchange (PBX) such as well known in the art provisioned with similar capabilities. Such communication server products are well known in the art. One example of such a product is the communication server available from Mitel Corporation of Kanata, Ontario, Canada. Communications server 120 also has a quality of service (QOS) comm module 123 coupled to, linked to or embedded in software 122. The communications server 120 interfaces with the multimedia desktop 102 and provides functions to allow the connection between multimedia devices such as multimedia desktop 102 and 110 that are connected to network 101. Communications server 120 not only provides the basic call control functions, but also implements features (supplementary services) such as putting a call on hold, notifying a multimedia desktop that a second call is waiting to be presented, camp-on, call-back, etc. It may also determine the routing of a multimedia communication in response from a request from a multimedia desktop computing device. Minimum bandwidth and quality of service requirements may be stipulated by the communication server 120, by the desktop 102, 110 or alternatively by the application requesting the multimedia communications.

Quality of service management server 130 is a device or combination of devices coupled to network 101 that contains resource management software 132 for monitoring and reporting the resources available on the network 101. Resources managed may include bandwidth or other QOS features available on each of the components necessary for establishing the multimedia communications. The information managed by QOS management server 130 is network accessible and may include MIBs as described in further detail below. Resource management software 132 interfaces with QOS caller modules 107/115 and QOS comm module 123. Optionally a network monitor or sniffer product such as Net-X-Ray from Axial Systems could be used with an appropriate driver application as QOS management server 130.

Figure 2:
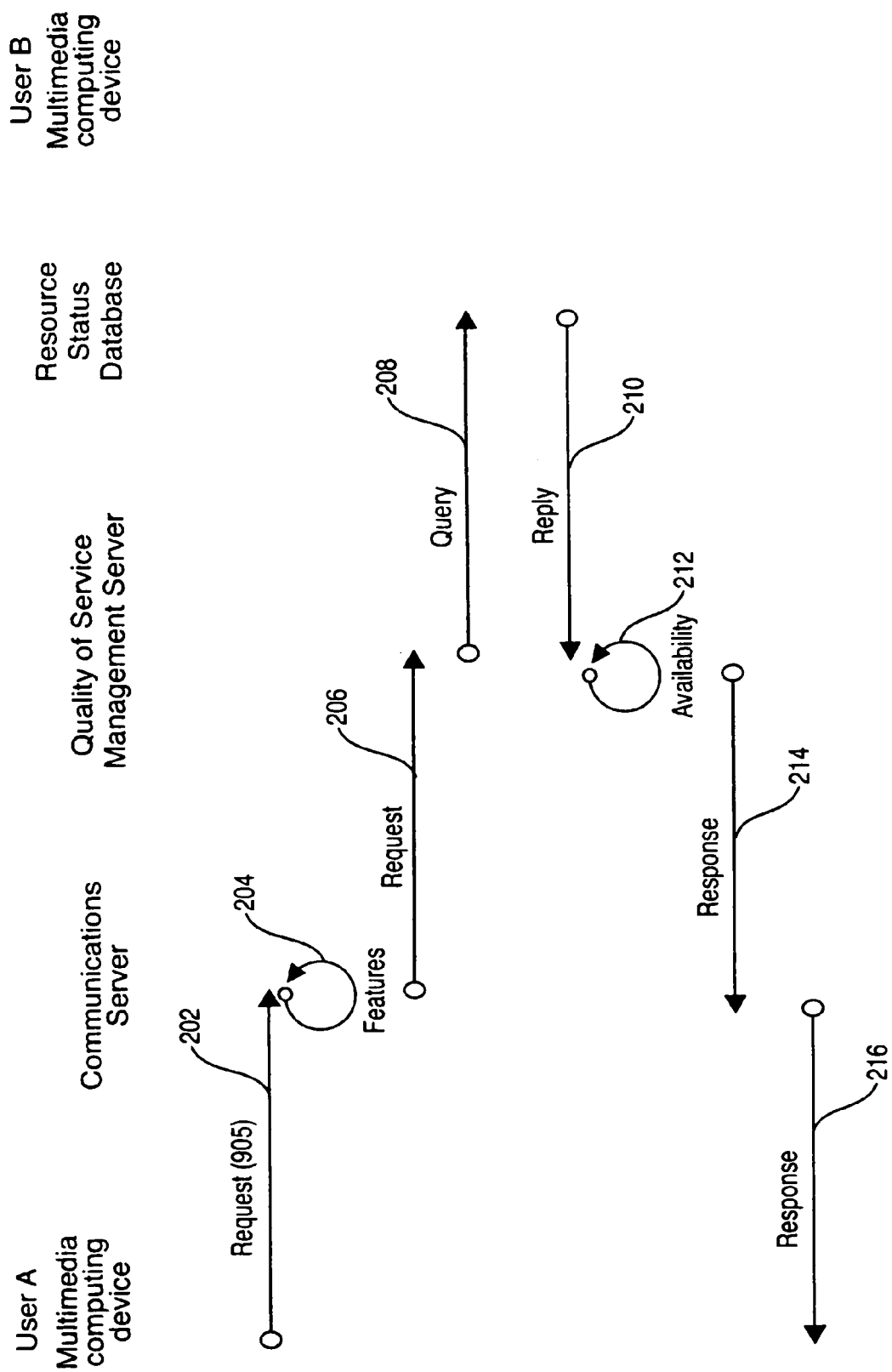
FIG. 2 is a diagrammatic representation of one example of the message flow between the components of FIG. 1.

Environment 100 also contains one or more resource status databases, such as MIB's 140, 142 and 144 coupled to network 101, or optionally directly coupled to QOS management server 130. MIBs 140, 142 and 144 are data bases containing information and are kept updated on bandwidth availability for various equipment on the various segments of network 101. In a preferred embodiment, MIBs may be any commercially available network accessible and programmable database management product such as Oracle or Ingres. They may be accessed and updated by QOS management server 130 FIG. 2 shows the interaction between the software modules that reside on the various components of FIG. 1. The arrows indicate a message being sent from one component to another, or processing done by a component. In the example of FIG. 2, a user (user A) interacts with a multimedia computing device such as multimedia computing device 102 of FIG. 1 to start a multimedia call to establish a connection to a user (user B) at another multimedia computing device, such as multimedia computing device 110 of FIG. 1. At step 202, the application software of the multimedia computing device originating the communication communicates with the call control software of the communication server, (such as communication server 120 of FIG. 1) requesting that a new call be established with one or more other destination multimedia devices. Using the QOS caller module, the application software sends a QOS request to the QOS comm module of the communications server. The destination address (user B's multimedia computing device) and the desired quality of service required for the call are provided in the request. One example of a desired quality of service is bandwidth but it is obvious to one skilled in the art that other features or aspects could be provided. At step 204, the communication server software of communications server, processing the request through the QOS comm module, determines the features necessary to establish the communications. These features could include the specific routing of the call, as well as other aspects including call-back, campon, QOS requirements or any other call related feature. At step 206, the communication server software, through the QOS comm module, issues a request to the resource management software of a quality of service management server, (such as quality of service management server 130 of FIG. 1) to check for the availability of resources, optionally including any necessary features. For example, the request could be for a certain bandwidth availability along a specific call route. At step 208, in response to the request, the resource management software of quality of service management server determines which resources would be necessary to complete the connection and queries the relevant databases which keep track, in real time, of the status and availability of the various devices along the communications route. Optionally, the resource management software of quality of service management server may tentatively reserve the necessary resources by updating any appropriate resource status databases (such as resource database 140, 142 and 144 of FIG. 1). At step 210, each of the resource status databases provides a response to the query regarding each of the required resources. At step 212, the resource management software of quality of service management server processes all of the replies to determine if all of the necessary resources are available at the desired level of service. At step 214, the resource management software of quality of service management server sends a reply through the QOS comm module to the communications server software on the availability of the resources at the desired quality of service. This reply could indicate that either all of the resources are available at the desired quality of service, or not. Using our example of bandwidth, the resource management software of quality of service management server software might report that the desired bandwidth is either available or not, along the entire communications route. At step 216, the communications server software sends a response using its QOS comm module back through the QOS caller module to the originating multimedia computing device on availability of resources. If the desired quality of service is available, then the multimedia communications device will establish the communications, as described with respect to FIG. 3. If the desired quality of service is not available, then the multimedia computing device could either abandon the communications and report the reason to the user, or, at the user's request, invoke or take some other appropriate action, like initiating a callback when the resources are available, or camping on the communications, or redirecting the communications elsewhere, or take any other appropriate action. These features could be implemented on requests from either the communications server software or the multimedia communications device application software. The example of initiating a callback is described in further detail with respect to FIG. 4.

Figure 3:
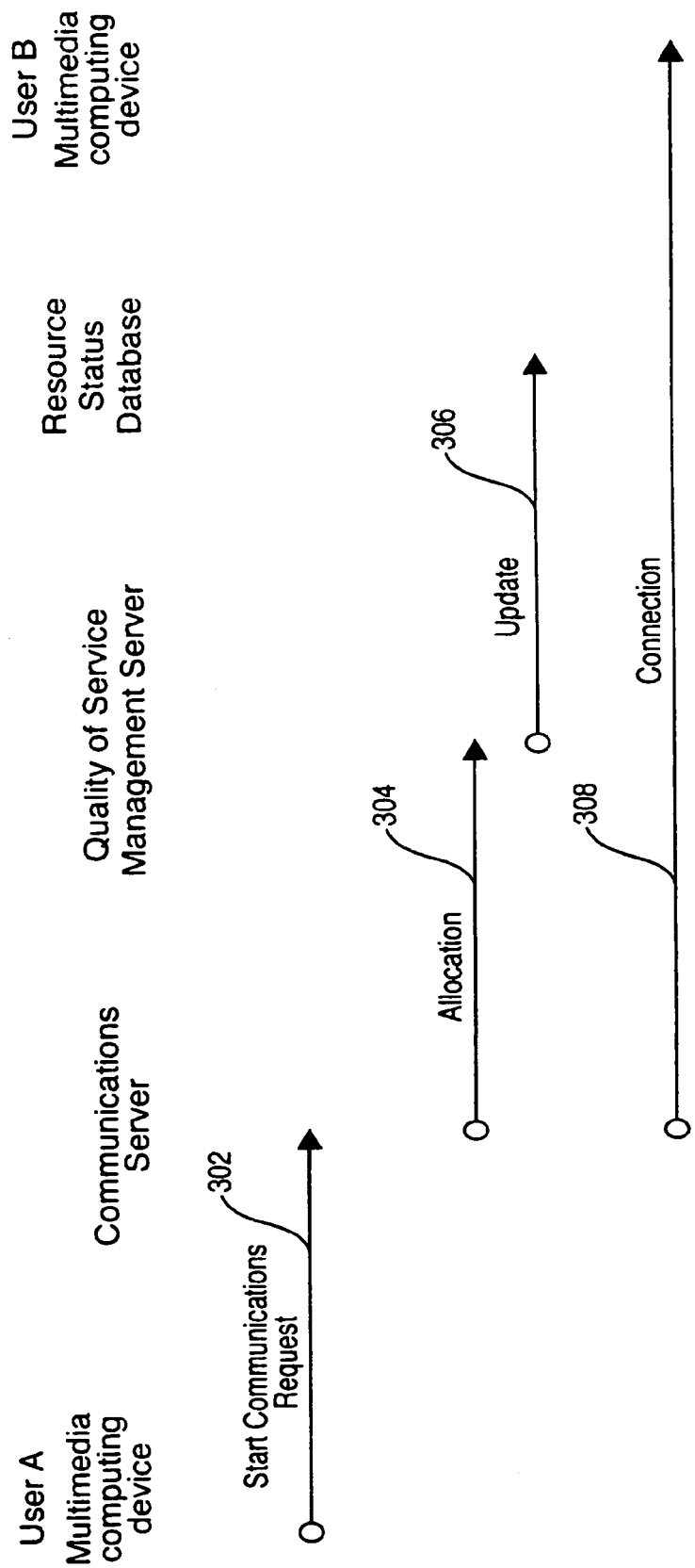
FIG. 3 is a diagrammatic representation continuing the example of FIG. 2 when the desired quality of service is available.

Turning to FIG. 3, the establishment of communications upon the receipt of a response 216 of FIG. 2 that the desired quality of service is available is described in further detail. At step 302, with the knowledge that the quality of service is available, the multimedia computing device application software through the QOS caller module generates a request through the QOS comm module to the communications server to start communications with the destination multimedia devices. At step 304, the communications server through the QOS comm module issues a request to the quality of service manager to allocate the resources at the desired quality of service. At step 306, the resource management software of quality of service management server sends a command to update the resource status databases for the appropriate resources to indicate the resources are in use. At step 308, the communications server software also issues the necessary commands to establish the connections to the desired destination multimedia devices. In this manner, the user of the originating multimedia computing device is assured that the appropriate resources are available for the communications.

Figure 4:
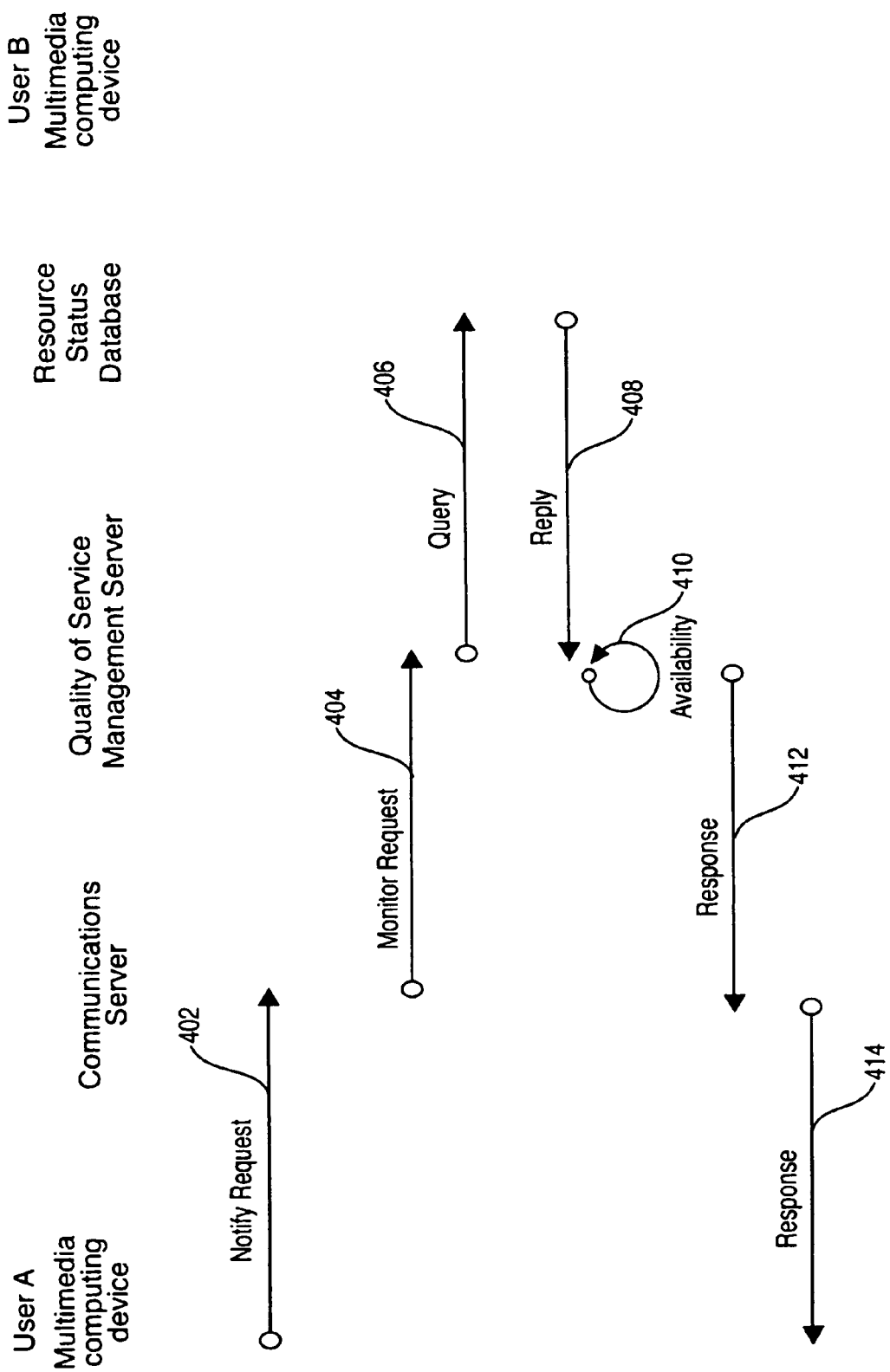
FIG. 4 is a diagrammatic representation continuing the example of FIG. 2 when the desired quality of service is not available.

Turning to FIG. 4, the implementation of a further or alternate course of action on the receipt of a response 216 of FIG. 2 that the desired quality of service is not available is illustrated in further detail. In the example of FIG. 4, the user, through the appropriate interface on the multimedia device, indicates the desire to be "called back" when the communications can be established with the desired quality of service. While the example of FIG. 4 illustrates a callback feature, other call features or alternate courses of action obvious to one skilled in the art, could be implemented in a similar manner. At step 402, the originating multimedia device application software, through the QOS call module generates a request to the communication server software QOS comm module to notify if and when the desired quality of service becomes available. At step 404, the communications server software, through the QOS comm module generates a request to the resource management software of quality of service management server to monitor the resource status databases until the desired quality of service become available. At step 406, the resource management software of quality of service management server send a query to each of the necessary resource status databases on the availability of the resources. At step 408, the resource status databases provide their reply. At step 410, the resource management software of quality of service management server processes all of the replies to determine whether the desired quality of service from all of the devices is available. It continues to repeat steps 406, 408 and 410 until the desired quality of service is available. Once available, the resource management software of quality of service management server sends a response back through the QOS comm module to the communication server software that the desired quality of service is available. At step 414, the communications server software, through the QOS comm module sends a response back to the originating multimedia device of availability of the desired quality of service. From this point, the communications can then be established, as described with respect to FIG. 2.

In alternate embodiments where software processes are combined to run on a single device, communications of messages between software processes can be performed using standard inter-process communication methods such as are well known in the art.

Although the invention has been described in terms of the preferred and several alternate embodiments described herein, those skilled in the art will appreciate other embodiments and modifications which can be made without departing from the spirit and scope of the teachings of the invention. All such modifications are intended to be included within the scope of the claims appended hereto.

The invention claimed is:

1. A system for management and control of multimedia communications resources comprising:
    (a) communications pathway;
    (b) an originating multimedia computing device coupled to said communications pathway with requested quality of service requirements;
    (c) one or more destination multimedia computing devices coupled to said communications pathway;
    (d) one or more quality of service management components coupled to said communications pathway; said one or more quality of service management components determines communications pathway availability for multimedia communications at said requested quality of service requirements in response to a request from said originating multimedia computing device to establish communications with said destination multimedia computing devices, and wherein said one or more quality of service management components send a positive or negative response to said originating multimedia computing device, said response corresponding to said request, whereupon said originating multimedia computing device takes alternative action upon receipt of said negative response;
    wherein said alternative action includes one of initiating a call back when said communications pathway is available at said requested quality of service, initiating camping on the communications pathway with said requested quality of service, and redirecting the communications through an alternate communications pathway with said requested quality of service.

2. The system of claim 1 wherein said quality of service management components includes at least one resource status database.

3. The system of claim 1 wherein said quality of service management components includes a plurality of resource status databases coupled to said communications pathway.

4. The system of claim 3 wherein said quality of service management components further includes at least one communications server coupled to said communications pathway; and at least one quality of service management server coupled to said communications pathway.

5. The system of claim 4 wherein said originating multimedia communications device and each said destination computing devices include executable software QOS caller modules.

6. The system of claim 4 wherein said communications server include executable software QOS comm modules.

7. The system of claim 1 wherein said desired quality of service includes bandwidth requirements.

8. A method of management and control of resources for multimedia communications comprising the steps of:
    (a) generating a request from an originating multimedia computing device to a quality of service management component for establishment of multimedia communications with one or more destination multimedia communications devices over a communications pathway with a requested quality of service;
    (b) issuing a query of available service quality of said resources from said quality of service management component to one or more resource status databases;
    (c) issuing replies from said resource status databases to said quality of service management component on said available service quality of resources;
    (d) processing said replies by said quality of service management component to determine availability of said requested quality of service;
    (e) sending a positive or negative response to said originating multimedia computing device from said quality of service management component corresponding to said request on said establishment of multimedia communications; and
    (f) taking alternative action by said originating multimedia communication device upon receipt of said negative response;
    wherein said alternative action includes one of initiating a call back when said communications pathway is available at said requested quality of service, initiating camping on the communications pathway with said requested quality of service, and redirecting the communications through an alternate communications pathway with said requested quality of service.

9. The method of claim 8 including the further step of establishing a connection with said originating multimedia communications device to said destination multimedia computing device to establish said communications at said requested quality of service upon receipt of said positive response.

10. A method of management and control of resources for multimedia communications comprising the steps of:
    (a) generating a first request from an originating multimedia computing device to a communications server for establishment of multimedia communications with one or more destination multimedia communications devices over a communications pathway with a desired quality of service;
    (b) determining features of said multimedia communications for said requested quality of service by said communications server;

(c) issuing a second request from said communications server to a quality of service management server for said requested quality of service with said features;
(d) issuing a query of available service quality of said resources from said quality of service management server to one or more resource status databases;
(e) issuing replies from said resource status databases to said quality of service manager on said available service quality of said resources;
(f) processing said replies by said quality of service manager to determine availability of said requested quality of service with said features;
(g) generating a first response from said quality of service manager to said communications server in response to said second request;
(h) sending a second response to said originating multimedia desktop device from said communications server in response to said first request on said establishment of multimedia communications; and
(h1) taking alternative action by said multimedia communication device upon receipt of a negative response, wherein said alternative action includes one of initiating a call back when said communications pathway is available at said requested quality of service, initiating camping on the communications pathway with said requested quality of service, and redirecting the communications through an alternate communications pathway with said requested quality of service.

11. The method of claim 10 including the further steps of:
(i) generating a third request from said originating multimedia desktop device to said communications server to commence communications with said destination multimedia devices;
(j) generating an allocation request from said communications server to said quality of service manager to allocate said resources;
(k) generating an update request from said quality of service manager to said resource status databases to record the allocation of said resources;
(l) issuing a connection command from said communication server to said destination multimedia computing device to establish said communications.

12. The method of claim 11, wherein said desired quality of service is bandwidth.

13. The method of claim 10 including the further steps of:
(i) generating a third request from said originating multimedia desktop device to said communication server to notify when said requested quality of service becomes available;
(j) generating a fourth request from said communication server to said quality of service manager to monitor said resource status databases;
(k) monitoring said resource status databases until said resources become available;
(l) generating a third response from said quality of service manager to said communication server when said resources become available;
(m) generating a fourth response from said communications server to said originating multimedia device of availability of said requested quality of service.

14. The method of claim 13, wherein said desired quality of service is bandwidth.

15. The method of claim 10, wherein said requested quality of service is bandwidth.

* * * * *